United States Patent Office 3,056,472
Patented Oct. 2, 1962

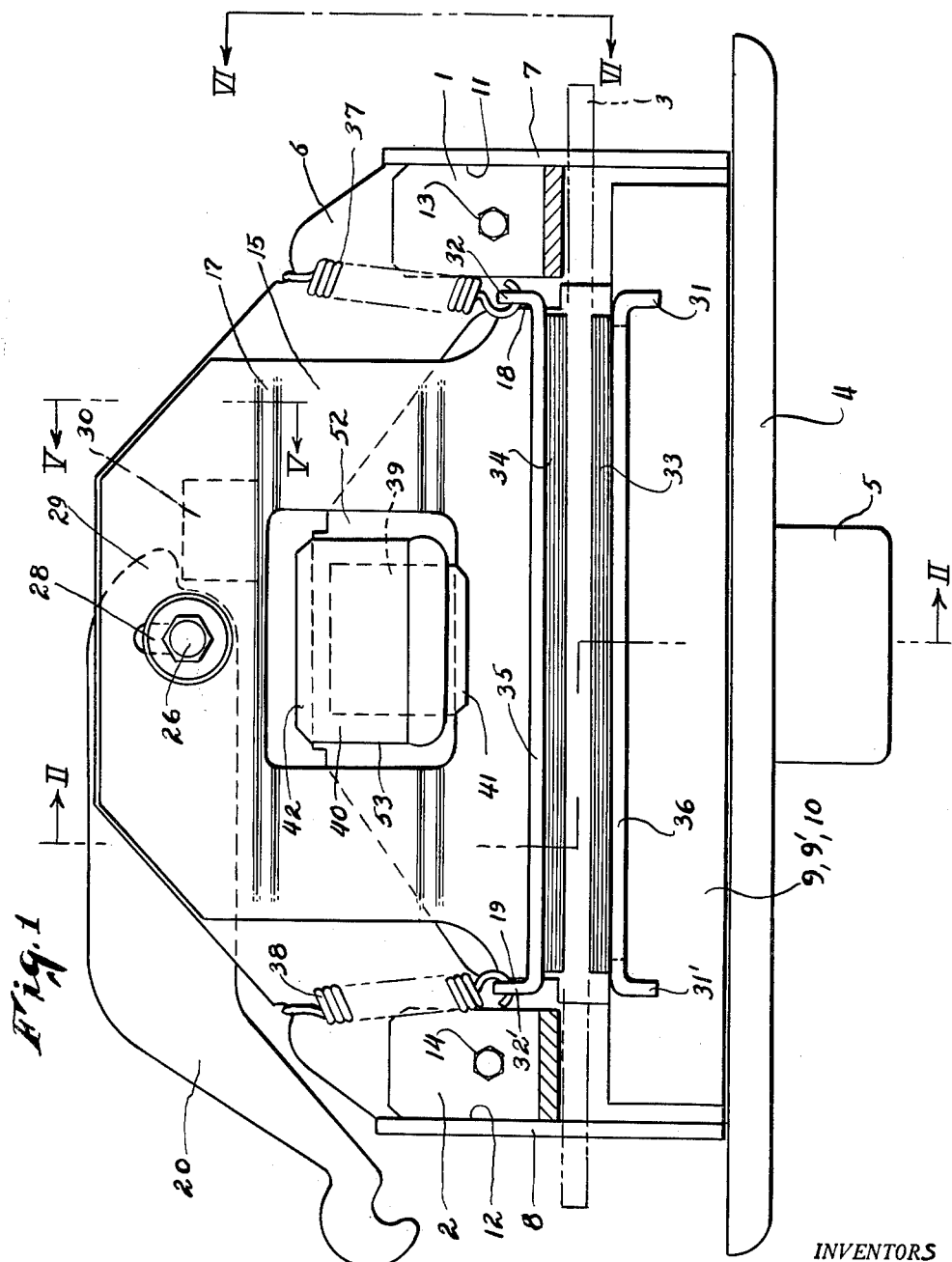

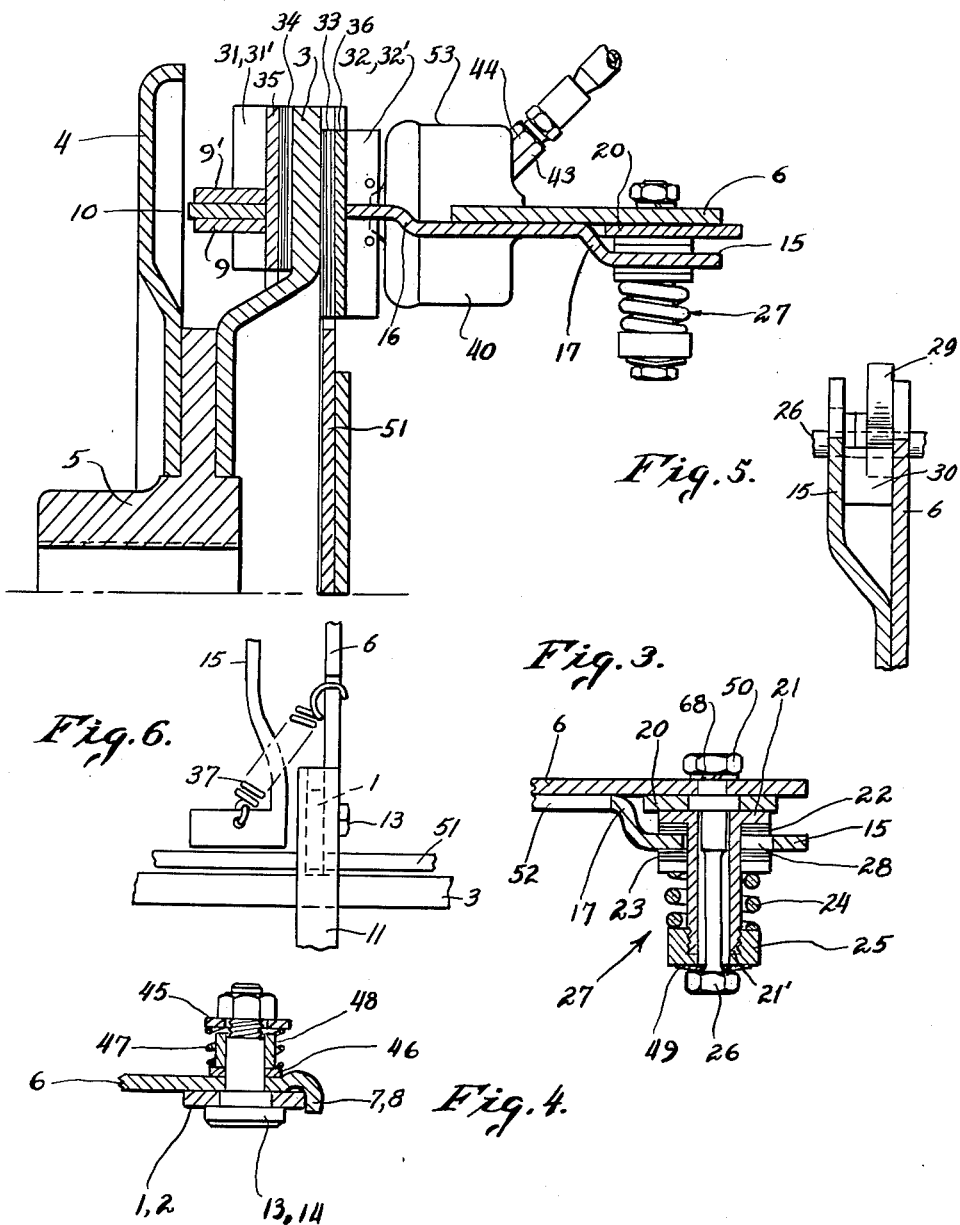

3,056,472
SEGMENT DISK BRAKE
Alfred Bessler, Heinz Rabe, Heinz Dobbelstein, and Hermann von Ey, all of Gifhorn, Hannover, Germany, assignors to Alfred Teves Maschinen- und Armaturenfabrik K.G., Frankfurt am Main, Germany
Filed Apr. 27, 1960, Ser. No. 25,032
Claims priority, application Germany Apr. 28, 1959
10 Claims. (Cl. 188—73)

Segment type disk-brake assemblies comprising yokes, jaws or the like will bulge in reaction to the brake pressures transmitted to them, and recover correspondingly upon brake release. The fact that this phenomenon adds significantly to the volume of hydraulic fluid displaced in brake action and that provision must be made to achieve correct brake clearance despite such recovery upon release argues in favor of the use of brake assemblies having the form of a frame, in the opening of which the rim of the brake disk revolves.

In one known type of disk brake, the members situated along the brake disk in such a frame each contain a hydraulic brake cylinder, and this renders it possible to fix the brake assembly rigidly to its mounting and have it act upon an axially immobilized disk.

There are other frame-type brake assemblies, floatingly lodged in their mounting, which support one of the brake linings, while a lining support on the other side of the disk travels within the opening of the frame on slide pins forming its end members. Only one brake cylinder is required, set between the lining support and the other side member of the frame. The slide pins forming the end members of the assembly are supported by bushings in the mounting. Aside from the fact that this structure comprises numerous precision-machined parts involving considerable manufacturing cost, uneven thrusts and uneven facing wear result from binding of parts or at least from a jerking action of the mechanism.

This invention proposes a brake made of substantially flat parts produced by forming, bending and trimming operations and requiring no machining. These flat parts are guided in the direction of brake action by their surfaces, edges and flanges, and the thrusts resulting from brake action are likewise absorbed by the edges and flanges of the plates. The brake assembly consists essentially of two flat closed frame plates forming the lining supports, one of which is movably or fixedly secured to the brake holder and embraces the brake disk with its plane perpendicular thereto while intersecting the brake disk in a secant, and the other of which slides upon the surface and inside edges of the first, as well as a brake cylinder having retaining grooves in the head of the cylinder housing and in the opposite or piston end, each of these grooves being engaged by an inner edge of one of the two frame plates, and advantageously a hand brake lever the short arm of which rotates on a fixed pivot in one of the frames and acts on the other frame.

According to the invention, the brake holder, likewise of plate-like construction, has two bracket tabs with which the underside of the frame embracing the disk may be in sliding contact or against which this frame may be resiliently urged without relative sliding displacement if, as generally true of plate-shaped members, the brake holder is sufficiently elastically deformable to enable a limited relative motion between the disk and the frame. The outside edges of the tabs serve as guides for flanges of the said frame in transmitting the brake forces, while the other frame plate has offset bends enabling it to slide on the underside of the frame embracing the brake disk with the outer edges of the former bearing on the inner edges of the latter in transmitting the effective brake pressure.

The offset frame plate according to the invention possesses a second offset; between it and the underside of the frame plate embracing the brake disk, the hand brake lever is placed and a hardened lug is inserted. The lug is rigidly attached to the offset frame and cooperates with a camming extension of the hand lever to serve as an abutment therefor, the latter being rotatable on a pivot fixed to the frame plate embracing the brake disk.

The metal plates supporting the brake linings ride loosely by means of notched tabs at their ends on the edges of the frame plates facing the brake disk. The tabs are arranged and notched so that both lining-support plates engage the frame embracing the brake disk, being thus secured against motion perpendicular to the frame.

The invention further provides that the brackets on the holder shall be assembled with the frame embracing the brake disk, and both frames with each other, by means of spring bolts. An oblong hole in one of the frames for the bolt connecting the frames permits their brake motion, and the same bolt serves as a pivot for the hand lever and as pin for an otherwise known friction-adjusting device.

The device according to the invention will now be more fully described with reference to the accompanying drawings, given by way of illustration and not of limitation, it being understood that many changes in the details may be made without departing from the spirit of the invention.

In the drawing:
FIG. 1 shows a bottom view of the brake;
FIG. 2 shows a section along the line II—II of FIG. 1;
FIG. 3 shows a section of the adjusting device;
FIG. 4 shows a section of an assembly bolt;
FIG. 5 shows a section along the line V—V of FIG. 1; and
FIG. 6 shows a side-elevational view taken along the line VI—VI of FIG. 1.

Only the bracket tabs 1, 2 of the brake holder 51 (FIG. 2) are visible in FIG. 1. In the same figure, the brake disk 3 is indicated only in outline and should be thought of as rigid with the wheel plate 4 and hub 5. A frame plate 6 with flanges 7, 8 has reinforcements 9, 9' of its member 10 on the other side of disk 3. The flanges 7, 8 of frame 6 form guide surfaces 11, 12 for the edges of brackets 1, 2, to which the latter the brake thrust is transmitted. The surfaces of brackets 1, 2 and frame 6 are kept in firm contact by the pressure of spring bolts 13, 14.

The other frame plate 15 has two offsets 16, 17. Offset 16 brings it from parallel contact with the underside of frame 6 into the same plane with it, with resulting lateral bearing contact at 18, 19. As may be seen in FIG. 3, the space formed by offset 17 accommodates the hand lever 20 as well as the head 21 of a stud 21' and a friction washer 22, which together with another friction washer 23, spring 24, nut 25 and bolt 26 form a frictional backlash adjuster 27. Bolt 26 serves at the same time as pivot for hand lever 20. For the adjusting motion, an oblong hole or slot 28 is provided in frame 15. In the space formed by offset 17 between frames 6 and 15, the short arm 29 of hand lever 20 cooperates with a hardened lug 30 fixedly connected to the offset frame 15.

The lining supports 35, 36 are of the same size and nearly the same shape. At each end, they have bent tabs 31, 31' and 32, 32', each of which is notched. The notches enable them to ride loosely on frame plate 15. The brake linings are designated by 33 and 34. Restoring springs 37 and 38 are hooked to lining-support plate 35 and frame plate 6. Frame plates 6, 15 match in such a manner as to leave an opening 52 serving to receive brake cylinder 53. Both the piston 39 and the cylinder 40 of brake cylinder 53 have grooves 41, 42 in their faces. Groove 41 is engaged by an inner edge of frame 15 and groove 42 by an inner edge of frame 6. Owing to the offset 16, grooves 41, 42 as well as the edges of frame plates 6, 15 are in one plane. The hydraulic pressure acts in the common plane of the two plates 6, 15 and is transmitted to the lining-support plates 35, 36 and linings 33, 34 in such manner that the latter are divided by the line of pressure into halves of nearly equal area, allowance being made, in known manner, for the fact that the speed of disk 3 is higher in the more peripheral parts of the brake linings. Cylinder 53 is provided with a connection 43 for the hydraulic line and a connection 44 for venting.

FIG. 3 shows a section of the adjusting device 27 previously mentioned above. In addition to its function of compensating wear of the brake linings, it serves the purpose of holding the frame surfaces together under the action of spring 24. The bolt 26 is small enough relative to the inside diameter of the tubular stud 21' to leave a space equal to the brake clearance. The pressure of spring washer 49 is overcome, in the act of adjustment, by the tension of restoring springs 37, 38. Bolt 26 is secured in frame 6 by means of nut 50 and lock washer 68.

FIG. 4 shows details of the spring-bolt connection between brackets 1 or 2 of brake mounting 51 and frame plate 6. The bolt 13 or 14 holds the said parts together under the pressure of spring 47 set between washers 45 and 46. Bushing 48 keeps the spring from being compressed to the limit if frame plate 6 lifts off brackets 1, 2.

In known manner, pressure fluid is supplied to brake cylinder 53, which forthwith displaces frames 6, 15 relative to each other and brings linings 33, 34 into contact with the disk while the holder 51 undergoes limited elastic deformation in moving toward disk 3 together with frame 6. The oblong hole 28 allows ample room to the adjusting device 27 in case, as a result of lining wear, the edges of frames 6, 15 engaging grooves 41 and 42 get looser in time upon contact of facings 33, 34 with disk 3. When the brake is released, holder 51 reverts to its illustrated shape; restoring springs 37, 38 act to move frames 6, 15 back to the extent of the existing clearance between the shank of bolt 26 and the inside diameter of sleeve 21, into the initial position. The adjusting motion is restrained in both directions by the action of friction washers 22, 23 under the pressure of spring 49.

For hand operation of the brake, lever 20 is rotated on pivot 26, and its short arm 29 acts on lug 30 fixed to frame 15 in such a manner that—as in hydraulic actuation—the two frames bring lining supports 35, 36 with linings 33, 34 into contact with the brake disk. On return of hand lever 20 into released position, tension springs 37, 38 withdraw the linings 33, 34 from disk 3.

To replace worn linings, the bolted connections 13, 14 are released and the brake is lifted off its holder. Then tension springs 37, 38 are unhooked, and nut 50 of the adjusting device 27 is loosened. Support plates 35, 36 may then be removed and replaced. After insertion of support plates with fresh linings, restoring springs 37, 38 are hooked up again, the brake is bolted to brackets 1, 2, and the adjusting device is set and drawn up tight.

What we claim is:

1. The combination with a pair of relatively rotatable objects of a brake assembly comprising a rotatable disk coupled with a rotatable one of said objects to be braked relative to the other of said objects, a first flat and rigid frame with a relatively large opening partly penetrated by said disk, a second flat and rigid frame with a relatively small opening lying flat against said first frame on one side of said disk with freedom of at least limited sliding displacement relative to said first frame and with its opening overlapping that of said first frame, fluid-operated expansible means in the overlapping part of said openings bearing upon internal edges of said frames generally parallel to said disk, guide means on one of said frames engaging the other of said frames for preventing relative sliding displacement of said frame in a direction parallel to said disk, first and second support means respectively mounted alongside opposite faces of said disk on another inner edge of said first frame and on an outer edge of said second frame generally parallel to said disk, brake linings carried on said support means adjacent said disk faces for respective contact therewith upon relative displacement of said frames by expansion of said fluid-operated means, holder means for securing one of said frames to said other of said objects, and restoring means for holding said brake linings apart and away from said disk in the unexpanded position of said fluid-operated means.

2. The combination with a pair of relatively rotatable objects of a brake assembly comprising a rotatable circular disk coupled with a rotatable one of said objects to be braked relative to the other of said objects, a first flat and rigid frame with a relatively large opening partly penetrated by said disk in a plane registering with a chord of said disk, a second flat and rigid frame with a relatively small opening lying flat against said first frame on one side of said disk with freedom of at least limited sliding displacement relative to said first frame and with its opening overlapping that of said first frame, fluid-operated expansible means in the overlapping part of said openings bearing upon internal edges of said frames generally parallel to said disk, guide means on one of said frames engaging lateral edges of the other of said frames for preventing relative sliding displacement of said frame within said plane in a direction parallel to said disk, first and second support means respectively mounted alongside opposite faces of said disk on another inner edge of said first frame and on an outer edge of said second frame generally parallel to said disk, brake linings carried on said support means adjacent said disk faces for respective contact therewith upon relative displacement of said frames by expansion of said fluid-operated means, holder means for securing said first frame to said other of said objects, and resilient restoring means anchored to said frames for holding said brake linings apart and away from said disk in the unexpanded position of said fluid-operated means.

3. A brake assembly according to claim 2 wherein said second frame is offset in the region of its opening at a line parallel to said disk dividing said second frame into a portion slidably supported by said first frame and a portion coplanar with said first plane, the internal edge of said first frame engaged by said fluid-operated means being part of said coplanar portion.

4. A brake assembly according to claim 3 wherein said fluid-operated means comprises a hydraulic cylinder having a groove accommodating one of said internal edges and a hydraulic piston having a groove accommodating the other of said internal edges, said piston projecting from said cylinder.

5. A brake assembly according to claim 2 wherein said guide means comprises a pair of lateral tabs on each of said support means, said tabs having outwardly facing notches, said lateral edges being inner edges of said first frame slidably received in said notches.

6. A brake assembly according to claim 2, further comprising retaining means resiliently urging said first frame against said holder means with freedom of limited displacement in a direction perpendicular to said frames.

7. A brake assembly according to claim 2, further comprising retaining means resiliently urging said frames against each other with freedom of limited relative displacement in a direction perpendicular to said frames.

8. A brake assembly according to claim 7 wherein one of said frames is provided with a slot perpendicular to said disk, said retaining means comprising a spring-loaded stud anchored to the other of said frames and passing through said slot in frictional engagement with the last-mentioned frame.

9. A brake assembly according to claim 8 wherein said second frame is formed with an offset portion spaced from said first frame and provided with said slot, further comprising a manually operable lever pivoted on said stud in the space between said first frame and said offset portion, and abutment means in said space anchored to said second frame for displacement by said lever toward said disk.

10. A brake assembly according to claim 9 wherein said stud is tubular, said retaining means further including a bolt passing through said stud with clearance and spring means frictionally interconnecting said stud and said bolt at one end, the other end of said bolt traversing said lever and being fixed to said first frame.

References Cited in the file of this patent

UNITED STATES PATENTS 2,784,811   Butler _____ Mar. 12, 1957

FOREIGN PATENTS 551,076   Italy _____ Nov. 15, 1956